United States Patent [19]

Sasaki et al.

[11] Patent Number: 4,677,039
[45] Date of Patent: Jun. 30, 1987

[54] ZINC-BROMINE BATTERY

[75] Inventors: Torahiko Sasaki; Kyoichi Tange, both of Susono; Masahiro Okawa, Okasaki; Yoshihiro Suzuki, Okazaki, all of Japan

[73] Assignee: Toyota Jidosha Kabushiki Kaisha, Aichi, Japan

[21] Appl. No.: 813,877

[22] Filed: Dec. 27, 1985

[30] Foreign Application Priority Data

Dec. 27, 1984 [JP] Japan .................... 59-278636
Dec. 27, 1984 [JP] Japan .................... 59-278637

[51] Int. Cl.⁴ ............................ H01M 8/04
[52] U.S. Cl. ........................ 429/14; 429/15; 429/29; 429/105
[58] Field of Search ............ 429/14, 15, 27, 29, 429/105

[56] References Cited

U.S. PATENT DOCUMENTS

| | | | |
|---|---|---|---|
| 4,105,829 | 8/1978 | Venero | 429/15 |
| 4,410,606 | 10/1983 | Loutfy et al. | 429/105 X |
| 4,469,760 | 7/1984 | Giner et al. | 429/105 X |
| 4,550,065 | 10/1985 | Fujii et al. | 429/105 |

Primary Examiner—Brian E. Hearn
Assistant Examiner—Stephen J. Kalafut
Attorney, Agent, or Firm—Parkhurst & Oliff

[57] ABSTRACT

A zinc-bromine battery is disclosed which includes anode and cathode reaction tanks separated from each other by a separator membrane for preventing self-discharge, and an electrolyte storage tank for storing an electrolyte with a bromine complexing agent added thereto. Catholyte and anolyte are circulated between the cathode reaction tank and the anode reaction tank, respectively, and the electrolyte storage tank. A perforated membrane which allows an electrolyte to permeate through it but which impedes the permeation of a bromine complex compound is provided within the electrolyte storage tank so as to separate the tank into an electrolyte mixing chamber into which both catholyte and anolyte flow and an electrolyte supply chamber which resupplies the mixed electrode as the catholyte and the anolyte. When the catholyte and anolyte are mixed with each other in the electrolyte storage tank, the zinc ion concentration is equalized as between the catholyte, so that the zinc ions contained in the electrolyte are effectively utilized during charge, thereby improving the charging capacity and efficiency.

5 Claims, 7 Drawing Figures

ZINC-BROMINE BATTERY

BACKGROUND OF THE INVENTION

1. Field of the Invention

This invention relates to a zinc-bromine battery, and more particularly, to improvements of an electrolyte circulation type zinc-bromine battery hving electrolyte storage tanks.

2. Description of the Prior Art

A zinc-bromine battery is known as a new type of battery. The following fundamental electrochemical reactions take place in a reaction tank provided with an anode and a cathode of a zinc-bromine battery.

The reaction at the cathode is:

$$2Br^- \rightleftharpoons Br_2 + 2e^-$$

The reaction at the anode is:

$$Zn_{2+} + 2e^- \rightleftharpoons Zn \quad (1)$$

The cell reaction is:

$$Zn^{2+} + 2Br^- \underset{discharge}{\overset{charge}{\rightleftharpoons}} Zn + Br_2$$

As is clear from the reaction formulae, zinc Zn is deposited during charge and bromine $Br_2$ which dissolves into the electrolyte is produced at the cathode. On the other hand, during discharge the zinc Zn deposited onto the anode is oxidized to $Zn^{2+}$ and dissolves into the electrolyte, while the bromine $Br_2$ in the electrolyte is reduced to bromine ion $2Br^+$ and dissolves into the electrolyte.

In such a zinc-bromine battery, the concentration of the bromine $Br_2$ in the electrolyte which is produced during charge increases as the charging time passes, and the bromine $Br_2$ gradually diffuses toward the anode. The bromine $Br_2$ reacts with the zinc Zn at the anode and becomes zinc ion $Zn^{2+}$ and bromine ion $Br^-$, thereby producing self-discharge. The zinc-bromine battery is therefore provided with a separator membrane which zinc ion $Zn^{2+}$ and bromine ion $Br^-$ can permeate but which impedes the permeation of bromine $Br_2$ in order to separate the reaction tank into anode and cathode reaction tanks, thereby preventing bromine $Br_2$ from diffusing from the cathode side to the anode side.

Furthermore, in order to prevent diffusion of the bromine $Br_2$, a complexing agent is added to the electrolyte of the zinc-bromine battery, so that the bromine $Br_2$ dissolved into the electrolyte on the cathode side is converted into a complex compound which is insoluble in the electrolyte, and is deposited and precipitated in the form of oil in the electrolyte.

FIG. 5 shows a conventional zinc-bromine battery produced on the basis of the above-described principle. In this battery, a cathode 12 and an anode 14 are provided within a reaction tank 10, one on each side thereof, whereby the electrochemical reactions indicated by the formulae (1) take place between the cathode 12 and anode 14 through electrolytes 16.

In such a zinc-bromine battery, zinc-bromide ($ZnBr_2$) aqueous solution is used as the electrolyte 16, and an electric conductance improver, a bromine complexing agent, a dendrite inhibitor and the like are added thereto as occasion demands.

During charge, the charging reaction shown in the formulae (1) takes place in the reaction tank 10, and bromine $Br_2$ is generated on the cathode side 12 and dissolves into the electrolyte 16, while on the anode side 14 zinc Zn is deposited and a precipitation layer 18 is formed on the anode 14.

On the other hand, the reaction which is reverse to the charging reaction takes place during discharge. Bromine $Br_2$ is reduced to bromine ion $2Br^-$ on the cathode side 12 and dissolves into the electrolyte 16, while on the anode side 14 the zinc precipitation layer 18 is oxidized to zinc ion $Zn^{2+}$, and dissolves into the electrolyte 16.

The reaction tank 10 in which these electrochemical reactions take place in provided with a separator membrane 20 which divides the interior of the tank into a cathode reaction tank 10a and an anode reaction tank 10b so as to prevent any occurrence of self-discharge caused by the bromine $Br_2$ which is produced during charge.

The separator membrane allows the electrolyte 16 to premeate therethrough but impedes the permeation of the bromine $Br_2$ which is in solution in the electrolyte 16, so as to prevent any occurrence of self-discharge. An ion-exchange membrane or a perforated membrane is generally used as the separator membrane 20, but a micro-porous membrane is more preferable from the viewpoint of reducing the inner resistance of the battery.

In an electrolyte circulation type battery, a catholyte storage tank 22 and an anolyte storage tank 24 are provided in order to store the energy obtained by the electrolysis reaction during charge.

Pipes 26 and 28 provided between the catholyte storage tank 22 and the cathode reaction tank 10a constitute an electrolyte circulation passage, and a pump 30 provided in the circulation passage delivers the catholyte 16a which has reacted in the cathode reaction tank 10a to the storage tank 22, and supplies new electrolyte 16a from the storage tank 22 to the reaction tank 10a.

Since a bromine complexing agent is added to the electrolyte 16a, the bromine $Br_2$ generated during the charge is complexed, and is deposited as a complex compound which is insoluble in the electrolyte 16. This complex compound is subsequently precipitated and stored at the bottom of the storage tank 22 as a complex compound storing chamber 22, as is shown in the battery of FIG. 5.

The complex compound storing chamber 32 is connected to the pipe 28 by a complex compound supply pipe 36 having a valve 34. This valve 34 delivers the complex compound which has precipitated in the complex compound storing layer 32 to the reaction tank 10a through the pipe 28 for the purpose of discharge.

Similarly, pipes 38 and 40 provided between the anolyte storage tank 24 and the anode reaction tank 10b constitute an electrolyte circulation passage, and a pump 42 provided in the circulation passage delivers the anolyte 16b which has reacted in the anode reaction tank 10b to the storage tank 24, and supplies new electrolyte 16b from the storage tank 24 to the reaction tank 10b.

In this way, this zinc-bromine battery can adequately store the electrolyte 16 in the storage tanks 22 and 24, cause the charging reaction shown in the formulae (1) in the stored electrolyte 16 during charge, store the bromine complex compound in the complex compound storing chamber 32, and form the zinc precipitation layer 18 on the anode 14, thereby storing electric power. During discharge, on the other hand, the zinc-bromine battery can deliver the bromine complex compound stored in the complex compound storing chamber 32 to the cathode reaction tank 10a, and cause the discharge reaction shown in the formulae (1) between the complex compound and the zinc precipitation layer 18 formed on the anode 14, thereby emitting the charge electric power.

Although a conventional zinc-bromine battery is capable of efficient charging and discharging in this way, it has the following problems which remain unsolved.

This kind of conventional zinc-bromine battery is completely divided into the cathode side of the anode side, and the catholyte 16a and the anolyte 16b are mixed with each other solely by permeation through the separator membrane 20. Since the separator membrane 20 has a predetermined resistance when the electrolyte 16 permeates it, it is impossible to store electric power by efficiently utilizing the zinc ions $Zn^{2+}$ which are contained in the catholyte 16a during charge. It is also impossible to effectively utilize the complexing agent contained in the anolyte 16b when a bromine complexing agent is contained in the electrolyte 16.

FIG. 6 shows the change in zinc ion concentration of the catholyte 16a and the anolyte 16b during charge.

As is obvious from the above-described reaction formulae, during charge the zinc ions $Zn^{2+}$ are attracted to the anode 14 and zinc Zn is deposited.

At this time, since the cathode side is separated from the anode side by the separator membrane 20, it is much more difficult for the zinc ions $Zn^{2+}$ in the catholyte 16a to move toward the anode 14 than the zinc ions in the anolyte 16b. Therefore, since the zinc ions in the anolyte 16b are consumed sooner than the zinc ions $Zn^{2+}$ in the catholyte 16a and charging is completed at that point, it is impossible to perform charging by adequately utilizing the zinc ions contained in the catholyte 16a.

In particular, when a salt halogenide such as KCl is added to the electrolyte 16 as a supported salt in order to improve the electric conductance of the electrolyte 16, or when an electrolyte of high concentration (more than 3 Mol/L $ZnBr_2$) is used, the difference in concentration of the electrolytes 16a and 16b becomes greater. Consequently, at the last stage of charge, the zinc ions contained in the anolyte 16b are reduced to an extreme extent in comparison with those of the catholyte 16a, and the utilization ratio of the zinc ions contained in the electrolyte 16 is further lowered.

FIG. 7 shows the zinc ion concentration when KCl is added to the electrolyte 16. As is clear from the graph, the difference in concentration of the zinc ions contained in the electrolytes 16a and 16b is greater in this case than the difference shown in FIG. 6, and it will be understood that the utilization ratio of the zinc ions is thereby further lowered.

This is because KCl added to the electrolyte 16 in this way reacts with the zinc ion $Zn^{2+}$ and becomes $(ZnCl_4)^{2-}$, so that some of the zinc ions which should intrinsically be plus become minus ions and are attracted toward the cathode side, thereby substantially lowering the concentration of the zinc ions contained in the electrolyte 16b.

In addition, the bromine $Br_2$ produced in the anolyte 16a during charge reacts with the bromine complexing agent and a bromine complex compound is formed. With the increase in amount of bromine complex compound, the concentration of the complexing agent contained in the anolyte 16a is lowered.

However, the utilization ratio of the bromine complexing agent contained in the anolyte 16b is low for a similar reason to that in the case of the zinc ions described above, and there has been a demand for effective countermeasures.

SUMMARY OF THE INVENTION

Accordingly, it is an object of the present invention to provide a zinc-bromide battery which is capable of reducing the difference in zinc ion concentration as between the catholyte and the anolyte, improving the utilization ratio of the zinc ions contained in the electrolyte, and increasing the charged electric energy.

To achieve this aim, a zinc-bromine battery according to the present invention is composed of a cathode reaction tank and an anode reaction tank which are separated from each other by a separator membrane for preventing self-discharge; and an electrolyte storage tank for storing an electrolyte with a bromine complexing agent added thereto; wherein a catholyte and an anolyte are circulated independently between the electrolyte storage tank and the respective reaction tanks.

The present invention is characterized in that the catholyte and anolyte are mixed in the storage tank for the purpose of removing any difference in zinc ion concentration.

The method of mixing the electrolytes according to the present invention includes a first method in which the electrolytes are directly stirred and mixed, and a second method in which they are mixed through an exchange membrane.

In the first method in accordance with the present invention, a perforated membrane having a multiplicity of minute holes which allows the electrolytes to permeate therethrough but which impedes the permeation of a bromine complex compound is used so as to divide the electrolyte storage tank into an electrolyte mixing chamber into which both catholyte and anolyte flow and an electrolyte supply chamber from which the mixed electrolyte is resupplied as the catholyte and the anolyte, and thereby the bromine complex compound contained in the catholyte is precipitated and stored in the electrolyte mixing chamber.

A supply pipe is provided between the complex compound storing chamber and a passage for the catholyte supplied from the electrolyte supply chamber.

The above-described structure of a zinc-bromine battery according to the present invention enables the catholyte and the anolyte which have finished a predetermined electrochemical reaction in the respective reaction tank to be stirred with each other and the stirred electrolytes to be resupplied as the catholyte and the anolyte to the respective reaction tanks.

The bromine generated on the cathode side during charge is complexed by the complexing agent, and this complex compound flows into the electrolyte mixing chamber of the electrolyte storage tank together with the catholyte.

However, the complex compound which has flowed into the electrolyte mixing chamber in this way is separated from the anolyte in the electrolyte mixing chamber by the perforated membrane provided in the storage tank, and is stored in the electrolyte mixing chamber on the upstream side of the perforated membrane.

Accordingly, no difference in concentration of zinc ions and bromine complexing agent is seen between the catholyte and the anolyte during charge of the zinc-bromine battery according to the present invention.

Therefore, according to the present invention, it is possible to equalize the zinc ion concentration of the anolyte to that of the catholyte without increasing the concentration of bromine and its complex compound, and to enhance the charging capacity by efficiently utilizing the zinc ions contained in the electrolytes, thereby improving the charging efficiency.

It is also possible to equalize the concentration of the complexing agent contained in the catholyte with that in the anolyte, and to efficiently utilize the complexing agents contained in the electrolytes during charge to efficiently complex the bromine generated on the cathode side and store it in the complex compound storing chamber.

When the electric power charged in this way is discharged, the complex compound stored on the upstream side of the perforated membrane is supplied to the catholyte through the supply pipe and the electrolyte which is mixed with the bromine complex compound is thereby supplied to the cathode reaction tank. Thus, it is possible to output the electric power from between the anode and cathode which has been charged through a predetermined reaction using the complex compound supplied to the cathode side in this way and the zinc deposited on the surface of the anode.

In the second method in accordance with the present invention, an electrolyte exchange membrane which allows the electrolyte to permeate therethrough but which impedes the permeation of bromine (including its complex compound) is provided as a partition between the catholyte storage tank and the anolyte storage tank, so that the catholyte and the anolyte are mixed with each other through the electrolyte-exchange membane.

The above-described structure enables the concentration of zinc ions contained in the catholyte and anolyte to be equalized with each other because the zinc ions alone permeate the electrolyte-exchange membrane when there is a difference in zinc ion concentration as between the catholyte and the anolyte.

At this time, since the movement of bromine and its complex compound is impeded by the electrolyte-exchange membrane, there is no possibility of rise in concentration of bromine and its complex compound in the anolyte, and hence, there is no possibility of generation of self-discharge.

Therefore, according to the present invention, the zinc ions contained in the catholyte are supplied to the anolyte without increasing the concentration of bromine and its complex compound. As a result, it is possible to enhance the charging capacity and thereby improve the charging efficiency by effectively utilizing the zinc ions contained in the electrolyte during charge.

The above and other objects, features and advantages of the present invention will become clear from the following description of the preferred embodiments thereof, taken in conjunction with the accompanying drawings.

DESCRIPTION OF THE PREFERRED EMBODIMENTS

Figure 5:
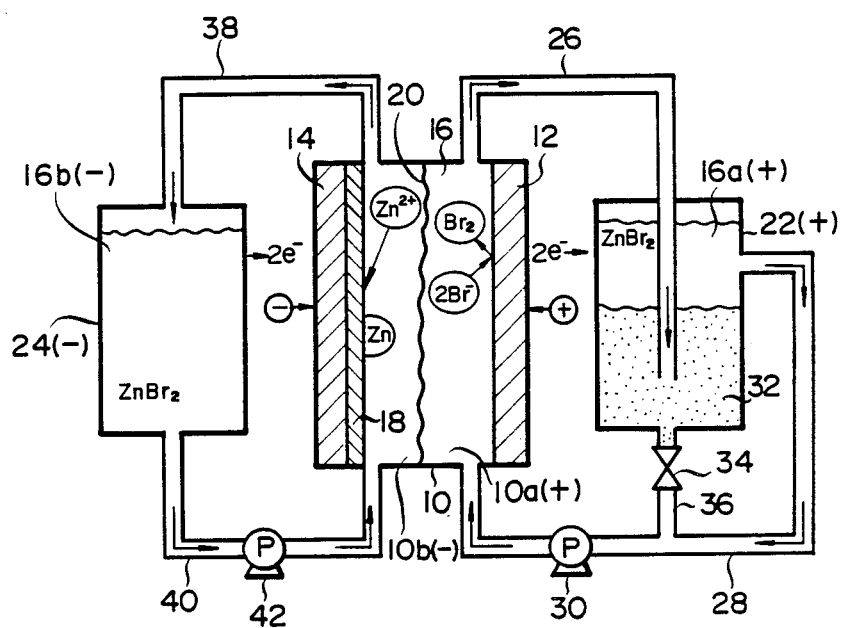
FIG. 5 is an explanatory view of a conventional zinc-bromine battery.
Figure 6:
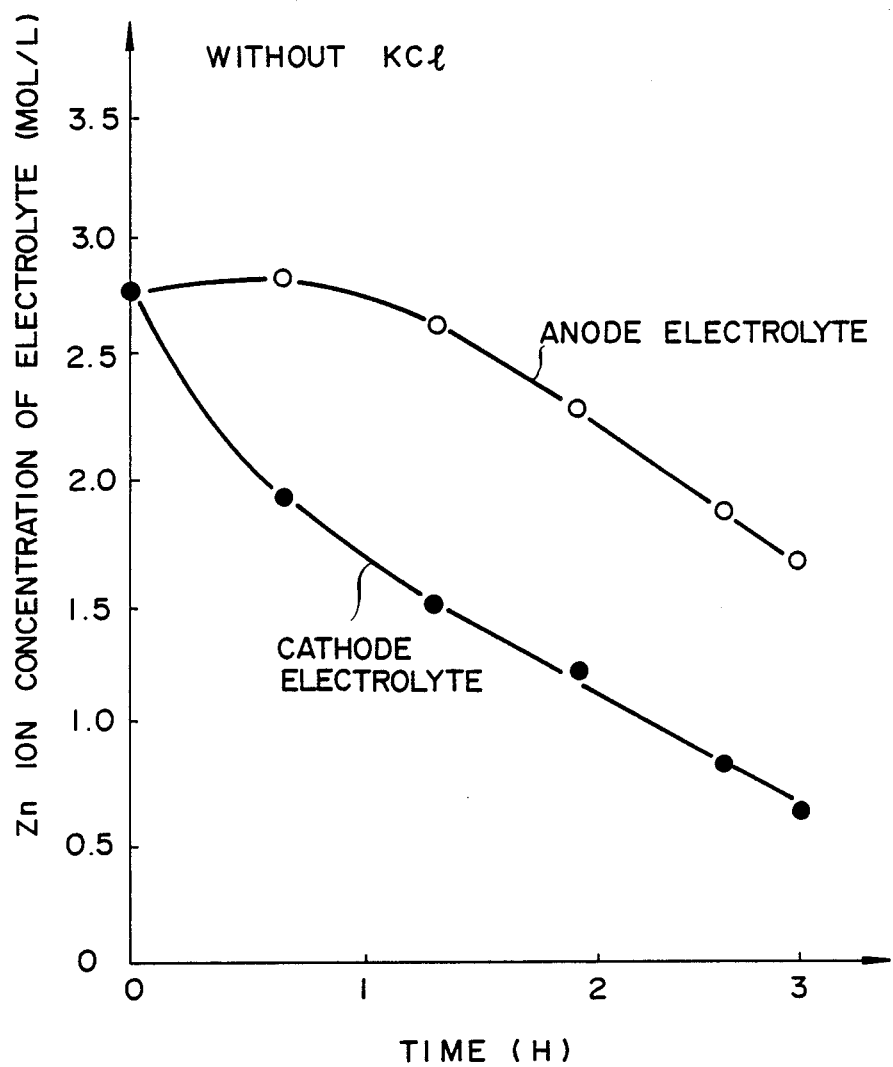
FIGS. 6 and 7 are characteristic curves of the conventional battery shown in FIG. 5.
Figure 7:
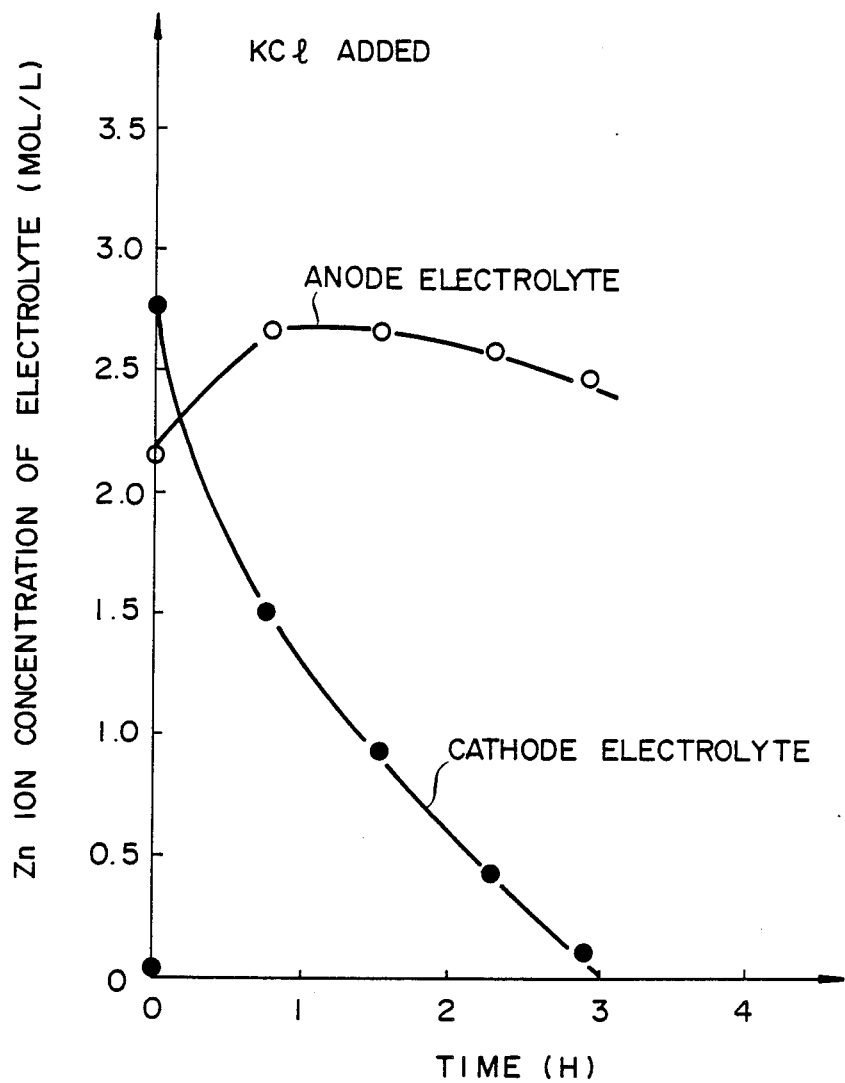

Preferred embodiments of the present invention will be described with reference to the accompanying drawings. The same numerals are provided for those elements which are the same as those in the convention device shown in FIG. 5, and explanation thereof will be omitted.

First Embodiment

Figure 1:
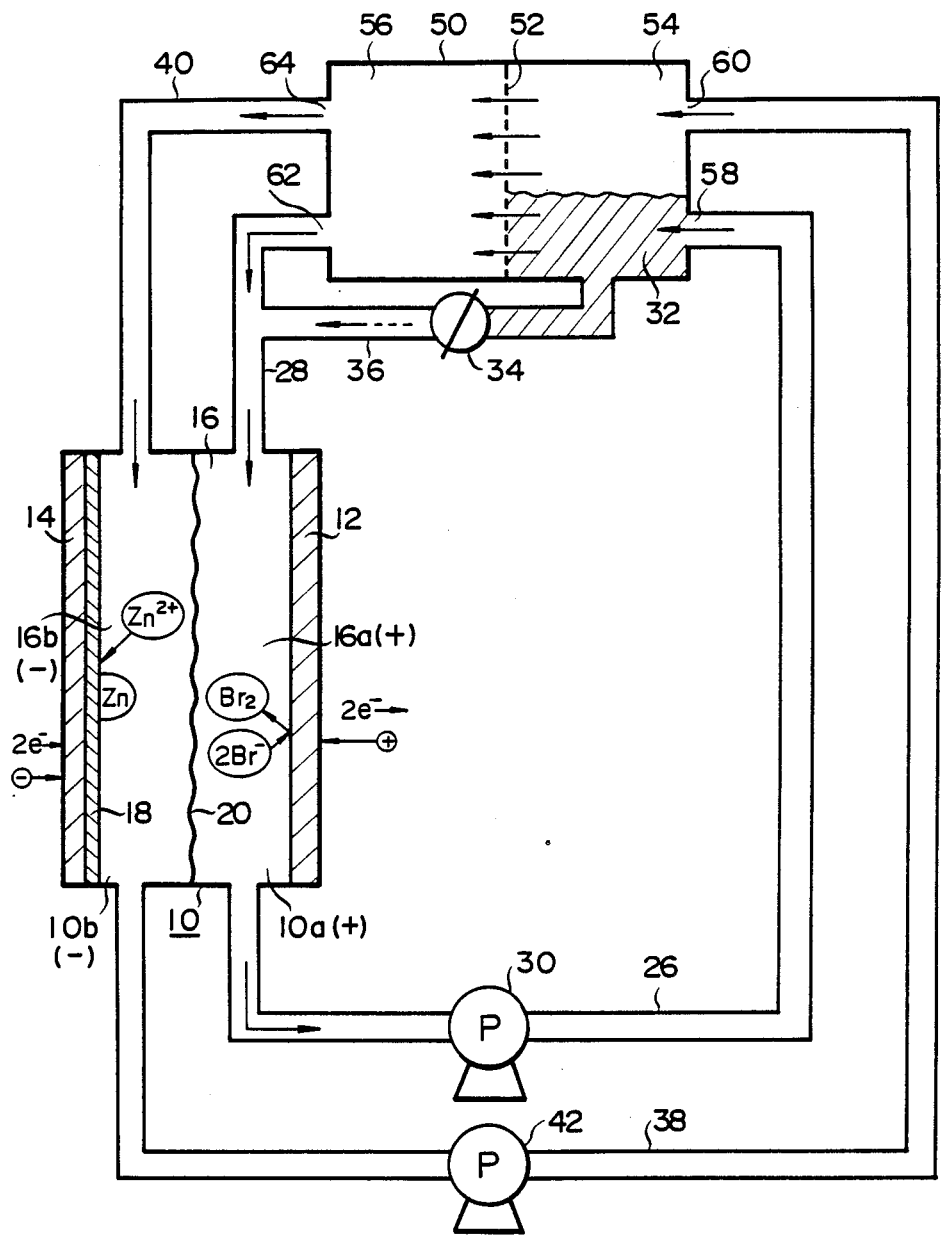
FIG. 1 is an explanatory view of a first embodiment of a zinc-bromine battery according to the present invention.

Referring first to FIG. 1, a first embodiment of a zinc-bromine battery according to the present invention is shown.

Although a conventional zinc-bromine battery has two separate electrolyte storage tanks, namely, a catholyte storage tank and an anolyte storage tank, this embodiment includes only one electrolyte storage tank 50. The electrolyte storage tank 50 is divided into an electrolyte mixing chamber 54 and an electrolyte supply chamber 56 by a perforated membrane 52 provided with a multiplicity of minute holes which allows the electrolyte 16 to permeate therethrough but which impedes the permeation of bromine and its complex compound.

The size of the minute hole which is formed on the perforated membrane 52 is small enough to impede the permeation of bromine and its complex compound. For example, a polyethylene film, a polypropylene film, or a thin film of such kind is perferable as the perforated membrane.

The mixing chamber 54 within the electrolyte storage tank 50 is provided with inlets 58 and 60 for receiving the catholyte 16a delivered from the cathode reaction tank 10a and the anolyte 16b delivered from the anode reaction tank 10b, respectively.

On the other hand, the supply chamber 56 of the electrolyte storage tank 50 is provided with outlets 62 and 64 for supplying the catholyte 16a and the anolyte 16b to the cathode reaction tank 10a and the anode reaction tank 10b, respectively.

Thus, in this embodiment, the catholyte 16a and the anolyte 16b which flows from the respective reaction tanks 10a and 10b flow into the mixing chamber 54 and are stirred therein. The stirred electrolyte 16 permeates the perforated membrane 52 and flows into the electrolyte supply chamber 56, in which it is separated again into the catholyte 16a and the anolyte 16b, and the electrolytes 16a and 16b are supplied from the outlets 62 and 64 to the cathode reaction tank 10a and the anode reaction tank 10b, respectively.

The bromine complex compound contained in the electrolyte 16a which has flowed into the mixing chamber 54 is separated when the electrolyte 16 permeates the perforated membrane 52, and precipitates at the bottom of the mixing chamber 54 as the complex compound chamber 32. Therefore, the electrolyte 16 which flows into the supply chamber 56 includes no complex compound.

A complex compound supply pipe 36 is provided between the complex compound layer 32 which is situated on the upstream side of the perforated membrane 52 and the pipe 28 which constitutes the passage for the catholyte supplied from the supply chamber 56 to the cathode reaction tank 10a. The complex compound which has precipitated and is stored in the complex compound chamber 32 is mixed into the catholyte 16a through this supply pipe 52.

Therefore, according to this embodiment, it is possible to equalize the zinc ion concentration of the anolyte to that of the catholyte without increasing the concentration of bromine and its complex compound, and to enhance the charging capacity by efficiently utilizing the zinc ions contained in the electrolytes, thereby improving the charging efficiency.

Second Embodiment

Figure 2:
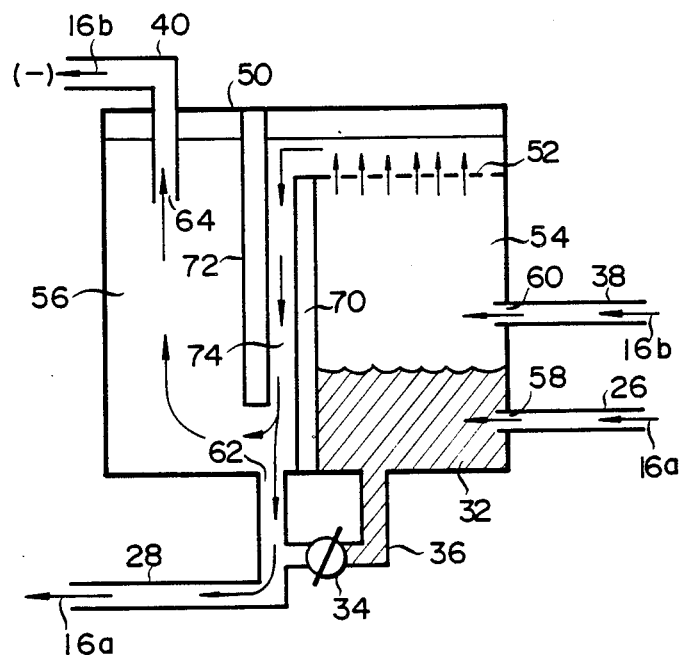
FIG. 2 is an explanatory view of a second embodiment of a zinc-bromine battery according to the present invention.

Referring next to FIG. 2 which shows a second embodiment of the present invention, the perforated membrane 52 is so arranged that the electrolyte 16 permeates it upwardly from the underside thereof in the electrolyte storage tank 50.

For this purpose, the electrolyte storage chamber 50 in this embodiment is provided with a partition wall 70 at the central portion of the bottom surface. The partition wall 70 substantially divides the tank into two chambers with the upper ends thereof open. The perforated membrane 52 is horizontally disposed between the upper end of the partition wall and the inner wall of the electrolyte storage tank 50, whereby the electrolyte storage tank 50 is divided into the electrolyte mixing chamber 54 and the electrolyte supply chamber 56.

The inlet 58 for the catholyte delivered through the pipe 26 is provided on one side at the lower portion of the side wall of the electrolyte mixing chamber 54, while the inlet 60 for the anolyte delivered through the pipe 38 is provided on one side at the central portion of the side wall thereof.

The result of this arrangement is that the catholyte 16a and the anolyte 16b flowing from the inlets 58 and 69, respectively, flow horizontally into the mixing chamber 54 toward the partition wall 70, and after having been adequately stirred, move upwardly, permeate the perforated membrane 52 upwardly from the underside thereof, and flow into the supply chamber 56.

While the electrolyte 16 permeates the perforated membrane 52 upwardly in this way, the bromine complex compound contained in the electrolyte 16 drops under the weight of its own gravity, and is separated by the perforated membrane 52, the separated complex compound appropriately precipitating toward the complex compound chamber 32. As a result, the electrolyte 16 having an extremely low concentration of bromine complex compound flows into the supply chamber 56.

In order to further lower the concentration of bromine complex compound of the anolyte 16b which is supplied from the supply chamber 56, a guide wall 72 is provided on the inner top wall of the supply chamber 56 in parallel to and in opposition to the partition wall 70. The guide wall 72 together with the partition wall 70 defines a guide passage 74 for downwardly introducing the electrolyte 16 which contains a small amount of bromine and its complex compound and which has permeated the perforated membrane 52.

The outlet 62 for supplying the electrolyte to the pipe 20 on the cathode side is provided at the bottom of the supply chamber 56 such as to communicate with the guide passage 74.

On the other hand the outlet 40 for supplying the electrolyte to the pipe 40 on the anode side is downwardly provided at the upper portion of the supply chamber 64.

In the zinc-bromine battery according to this embodiment, the bromine complex compound contained in the electrolyte 16 which has flowed into the mixing chamber 54 is considerably separated when the electrolyte 16 permeates the perforated membrane 52.

The small amount of complex compound which as permeated the perforated membrane 52 drops under the weight of its own gravity when the electrolyte 16 flows downwardly through the guide passage 74, and is supplied together with the catholyte 16a from the outlet 62 to the cathode reaction tank 10a. The remaining complex compound which is still contained in the electrolyte 16 drops under the weight of its own gravity when the electrolyte 16 moves upwardly toward the outlet 64, as is indicated with the arrows in FIG. 2, thereby being separated from the electrolyte 16. In this way, it is possible to make the concentration of compound complex contained in the electrolyte which flows out as the anolyte 16b from the outlet 64 lower than the concentration of complex compound contained in the electrolyte immediately after the permeation through the perforated film 52.

The above described structure of the second embodiment solves the technical problems of the present invention and achieves the aim thereof.

In addition, since the catholyte and the anolyte are completely mixed with each other in the electrolyte mixing chamber, the complexing agent in the anolyte which conventionally has hardly been utilized at all can be efficiently utilized in this embodiment. Accordingly it is possible to reduce the amount of complexing agent which needs to be added.

The increase in pH of the electrolyte is caused by $H_2$ gas which is generated when the electrolyzed zinc naturally dissolves into the electrolyte, or when self-discharge is generated, mainly on the anode side. The pH of the anode side shows a tendency to increase in comparison with that of the cathode side in the prior art. In this embodiment, however, since the catholyte and anolyte are completely mixed, the rise in pH of the anolyte is controlled.

Third Embodiment

Figure 3:
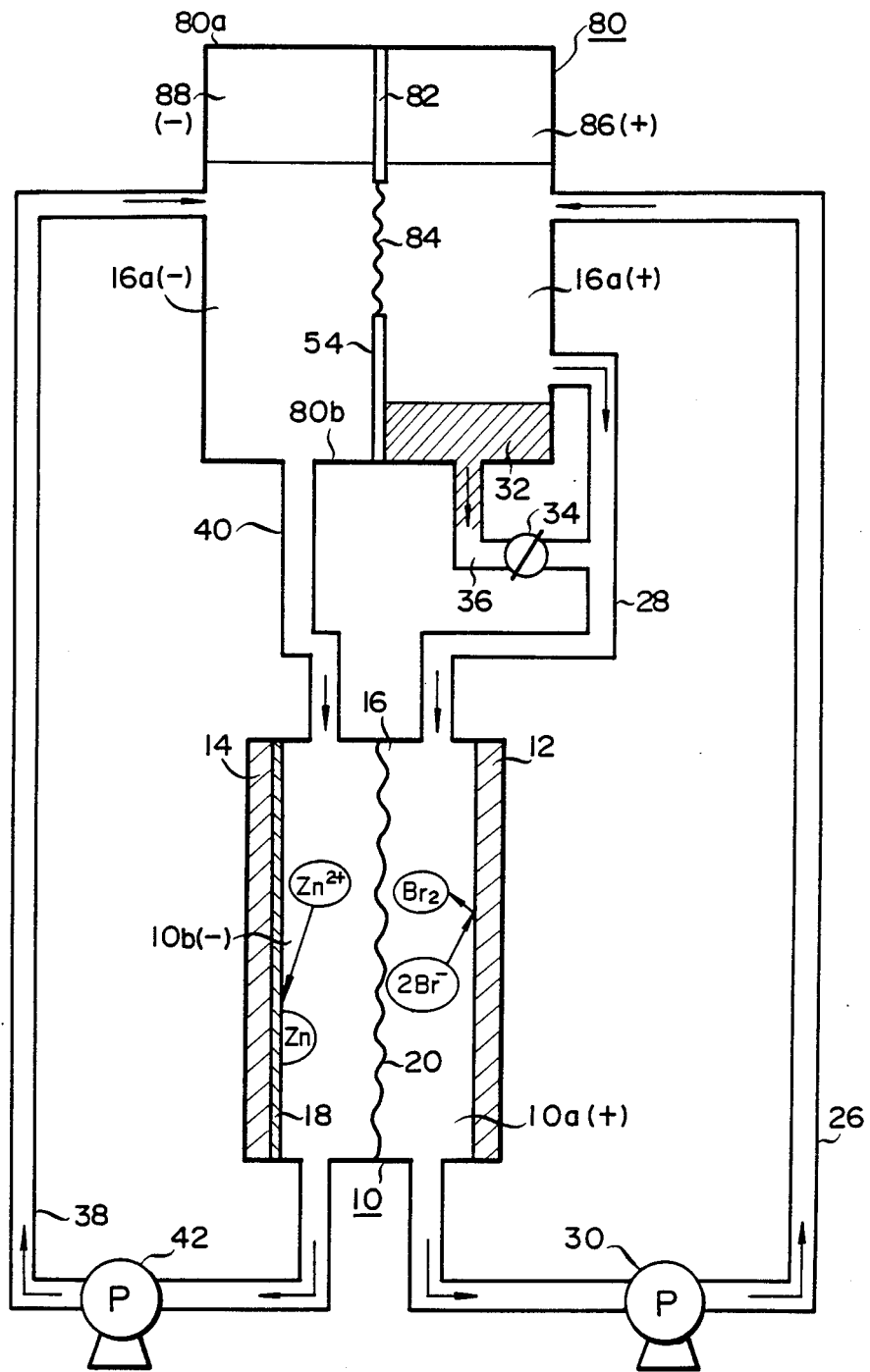
FIG. 3 is an explanatory view of a third embodiment of a zinc-bromine battery according to the present invention.

FIG. 3 shows a third embodiment of a zinc-bromine battery according to the present invention.

In this embodiment, an electrolyte storage tank 80 is divided into two chambers, namely a catholyte storage tank 86 and an anolyte storage tank 88 by a partition wall 82 and an electrolyte-exchange membrane 84.

The partition wall 82 extends vertically down from the inner top surface 80a and up from the bottom surface 80b of the storage tank 82 so as to divide the storage tank 80 into two sides at the central portion. A perforated polyethylene or polypropylene membrane 84 of a large mesh size is secured to the window portion provided at the center of the partition wall 82 as the electrolyte-exchange membrane.

The operation of this embodiment will be now explained.

Since the catholyte storage tank 86 and the anolyte storage tank 88 are separated from each other by the perforated polyethylene or polypropylene membrane 84, when there is a difference in zinc concentration as between the catholyte 16a and the anolyte 16b stored in the storage tanks 86 and 88, respectively, the zinc ions permeate the perforated polyethylene or polypropylene membrane 84, and the electrolytes 16a and 16b are mixed, thereby eliminating the unbalance between zinc ion concentration in the two electrolytes.

Accordingly, if the zinc ions contained in the anolyte 16b react with the anode 14 and its concentration is lowered, the zinc ions contained in the catholyte 16a permeates the perforated polyethylene or polypropylene membrane 84 and proceed toward the anolyte 16b.

In this way, according to the present invention, the zinc ions contained in the catholyte are supplied to the anolyte without increasing the concentration of bromine and its complex compound. As a result, it is possible to enhance the charging capacity and thereby iprove the charging efficiency by effectively utilizing the zinc ions contained in the electrolyte during charge.

Fourth Embodiment

Figure 4:
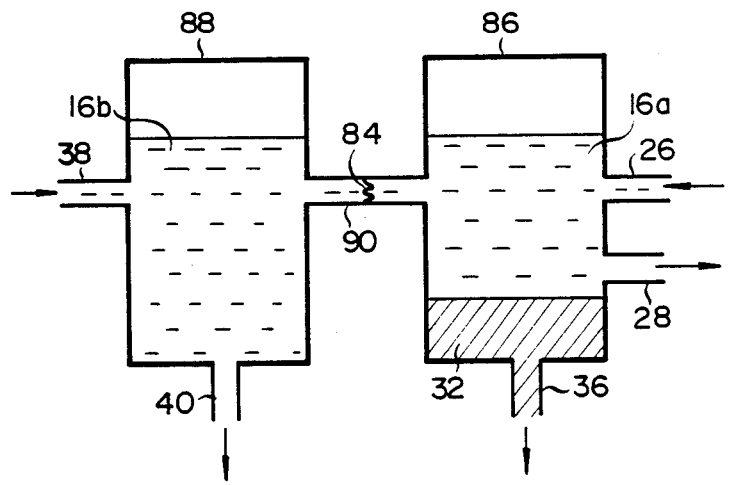
FIG. 4 is an explanatory view of a fourth embodiment of a zinc-bromine battery according to the present invention.

A fourth embodiment of zinc-bromine battery according to the present invention is shown in FIG. 4. In this embodiment, the catholyte storage tank 86 and the anolyte storage tank 88 are provided independently of and remote from each other. An electrolyte connection pipe 90 is provided bewteen the two tanks 86 and 88, and a perforated polyethylene or polypropylene membrane 50 is provided within the connection pipe 90 as the electrolyte-exchange membrane for the purpose of partition.

The above-described structure of this embodiment solves the technical problems of the present invention and achieves the aim thereof. Since the catholyte and the anolyte are mixed through the electrolyte-exchange membrane, the bromine (including bromine complex compound) in the catholyte is unlikely to flow into the anolyte and lower the Coulomb effect.

Furthermore, since the communication area between the catholyte storage tank and the anolyte storage tank is large in comparison with the case of passing the electrolyte without provision of the electrolyte-exchange membrane, zinc ions can be more efficiently replenished from the catholyte storage tank to the anolyte storage tank.

In addition, the catholyte and anolyte can be mixed without any need for increase in such energy as pump energy.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. In a zinc-bromine battery wherein catholyte and anolyte are circulated between
    a cathode reaction tank and an anode reaction tank which are separated from each other by a separator membrane for preventing self-discharge, and
    an electrolyte storage tank for storing an electrolyte with a bromine complexing agent added thereto,
    the improvement comprising a perforated membrane provided with a multiplicity of minute holes, said membrane allows electrolyte to permeate therethrough but impedes the permeation of a bromine complex compound and is provided within said electrolyte storage tank in order to divide said electrolyte storage tank into an electrolyte mixing chamber for mixing catholyte and anolyte and an electrolyte supply chamber for resupplying mixed catholyte and anolyte to said catholyte reaction tank.

2. A zinc-bromine battery according to claim 1, wherein a complex compound supply pipe is provided between the bottom of said electrolyte mixing chamber, which constitutes a complex compound storing chamber, and a passage for said catholyte which is supplied from said electrolyte supply chamber.

3. A zinc-bromine battery according to claim 1, wherein said perforated membrane is provided in said electrolyte storage tank such that said electrolyte permeates said perforated membrane upwardly from the underside of said membrane.

4. In a zinc-bromine battery in which catholyte and anolyte are circulated independently of each other between
    a cathode reaction tank and an anode reaction tank which are separated from each other by a separator membrane for preventing self-discharge, and
    a catholyte storage tank and an anolyte storage tank,
    the improvement comprising an electrolyte-exchange membrane between the catholyte storage tak and the anolyte storage tank but not between the cathode reaction tank and the anode reaction tank, said membrane allowing electrolyte to permeate therethrough but impeding the permeation of bromine and a bromine complex compound in order to mix said catholyte and said anolyte.

5. A zinc-bromine battery according to claim 4, wherein a perforated membrane is used as said electrolyte-exchange membrane.

* * * * *